United States Patent
Alvarez et al.

(10) Patent No.: US 12,410,673 B2
(45) Date of Patent: Sep. 9, 2025

(54) SEAL, METHOD, AND SYSTEM

(71) Applicant: Baker Hughes Oilfield Operations LLC, Houston, TX (US)

(72) Inventors: Miguel Alvarez, Guanajuato (MX); Thomas Banditrat, Houston, TX (US); Joshua Raymond Snitkoff, Houston, TX (US)

(*) Notice: Subject to any disclaimer, the term of this patent is extended or adjusted under 35 U.S.C. 154(b) by 166 days.

(21) Appl. No.: 18/169,075

(22) Filed: Feb. 14, 2023

(65) Prior Publication Data
US 2024/0271503 A1    Aug. 15, 2024

(51) Int. Cl.
*E21B 33/10*   (2006.01)
*E21B 33/12*   (2006.01)
*F16J 15/08*   (2006.01)

(52) U.S. Cl.
CPC .......... *E21B 33/10* (2013.01); *E21B 33/1212* (2013.01); *F16J 15/0887* (2013.01)

(58) Field of Classification Search
CPC ...... E21B 33/1212; E21B 33/10; F16L 17/06; F16L 19/0212; F16L 23/16; F16L 23/162; F16L 19/025; F16L 2201/00; F16J 15/0887
See application file for complete search history.

(56) References Cited

U.S. PATENT DOCUMENTS

| | | | |
|---|---|---|---|
| 3,489,170 A | 1/1970 | Leman | |
| 4,007,972 A | 2/1977 | Baylor | |
| 4,674,575 A | 6/1987 | Guess | |
| 5,263,847 A | 11/1993 | Akkerman et al. | |
| 5,297,805 A * | 3/1994 | Merkin | F16J 15/022 277/540 |
| 7,841,416 B2 | 11/2010 | Henschel et al. | |
| 9,726,300 B2 | 8/2017 | Zhao et al. | |
| 9,745,822 B2 | 8/2017 | Bernard et al. | |
| 10,443,348 B2 | 10/2019 | Williamson | |
| 2003/0121664 A1 | 7/2003 | Hill et al. | |
| 2008/0047713 A1 | 2/2008 | Henschel et al. | |

(Continued)

FOREIGN PATENT DOCUMENTS

| | | |
|---|---|---|
| CN | 112228026 A | 1/2021 |
| CN | 214946342 U | 11/2021 |
| GB | 2553956 B | 11/2019 |

OTHER PUBLICATIONS

Notification of Transmittal of the International Search Report and the Written Opinion of the International Searching Authority, or the Declaration; PCT/US2024-015092; Mail date: May 23, 2024; 12 pages.

(Continued)

*Primary Examiner* — Giovanna Wright
(74) *Attorney, Agent, or Firm* — Baker Hughes Company

(57) ABSTRACT

A seal includes a torque shoulder and a seal member complimentary to a concavity in the torque shoulder. A method for sealing a connection includes elastically deflecting a seal member, and contacting a torque shoulder with the seal member. The method further includes preventing further movement of a first component and a second component toward one another after contacting of the torque shoulder. A borehole system including a borehole in a subsurface formation, a downhole tool in the borehole, the tool including the seal described above.

20 Claims, 13 Drawing Sheets

(56) References Cited

U.S. PATENT DOCUMENTS

| | | |
|---|---|---|
| 2008/0169610 A1 | 7/2008 | Curington |
| 2009/0314979 A1 | 12/2009 | Mcintire |
| 2010/0090410 A1 | 4/2010 | Doane et al. |
| 2019/0032442 A1* | 1/2019 | Kohn ................. F16J 15/16 |

OTHER PUBLICATIONS

Notification of Transmittal of the International Search Report and the Written Opinion of the International Searching Authority, or the Declaration; PCT/US2024/015093; Mail date: Jun. 10, 2024; 8 pages.

* cited by examiner

SEAL, METHOD, AND SYSTEM

BACKGROUND

In the resource recovery and fluid sequestration industries sealing is very important and can be vexatious. There are myriad different sealing paradigms and myriad different seals in the market but it is a never ending move to more reliability while moving to simplicity and with materials that are robust.

SUMMARY

An embodiment of a seal including a torque shoulder having a torque face and a seal support concavity, the torque shoulder having a longitudinal extent and an arcuately shaped seal member complimentary to the concavity and spaced from the torque shoulder when in an uncompressed position.

An embodiment of a method for sealing a connection including urging a first component toward a second component, where one of the components includes the seal, contacting the seal member with the first or second component, elastically deflecting the seal member, and contacting the torque shoulder with the same first or second component and limiting deflection of the seal member by preventing further movement of the first component and second component toward one another after contacting of the torque shoulder.

An embodiment of a downhole tool having a first seal and a second seal oriented in an opposite direction to the first seal.

An embodiment of a borehole system including a borehole in a subsurface formation, a downhole tool in the borehole, the tool including the seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
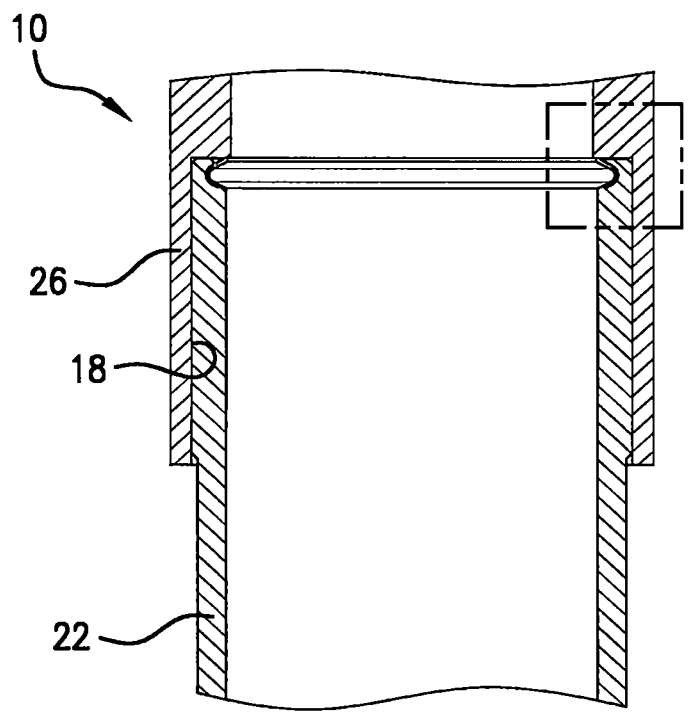
FIG. 1 is a sectional view of a seal as disclosed herein.
Figure 2:
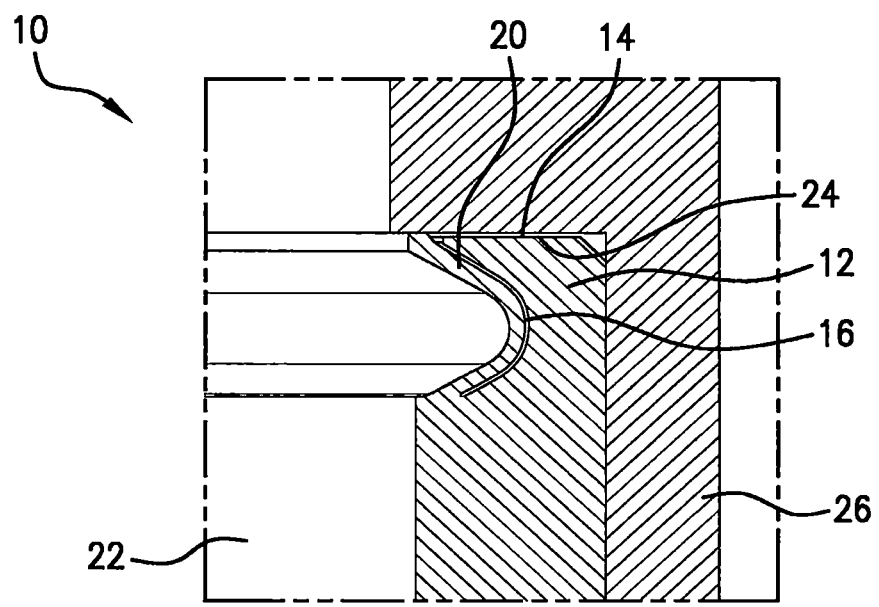
FIG. 2 is an enlarged view of a portion of FIG. 1.

Referring to FIGS. 1 and 2, a seal 10 is illustrated that is useful for a number of tools such as safety valves, sand control isolation valves, ball valves, etc. The seal 10 includes a torque shoulder 12. The torque shoulder 12 features a torque face 14 and a seal member support concavity 16. The torque shoulder 12 exhibits a longitudinal extent as illustrated and that is shorter than a seal member 20. The seal member 20 is arcuately shaped and complimentary to the concavity 16. The seal member 20 when in a non-sealed or uncompressed position, is spaced from the torque shoulder 12. In the embodiment of FIGS. 1 and 2, the seal 10 is a part of a first competent 22 and a mating surface 24 is a part of a second component 26. It will be understood that the seal 10 could be on the opposite component with the same result It is also contemplated that a seal 10 may be on both components 22 and 26 (i.e. extending from each of the components as it is illustrated to do from component 22 in FIG. 1). In such a configuration a seal 10 would extend from each component and each component would have a mating surface. The seal members 20 would contact the opposing component at about the same time and begin the seal while the torque shoulders would contact the opposing component after the seal members but also at about the same time as each other. Two seals are thus created where one of the seals 10 is radially inwardly disposed of the other seal 10.

Referring back to FIG. 1, during use, the first and second components 22 and 26 are urged into closer contact with one another either by press fit, thread 18 (and drawn together by the threading of the thread), etc. The seal member 20 possesses the above noted initial longitudinal extent or "height" that is longer than that of torque shoulder 12 so that an initial seal is created upon bringing components 22 and 26 together. In the orientation of the figure, this can be referred to as "height" but it is cautioned that the seal may operate in all orientations of the downhole tool of which it may form a part and hence the term "height" is only relevant with regard to the particular orientation of the Figures herein. The reason for the height difference over the torque shoulder 12 is so that contact will be made with a surface, such as surface 24 of another component, such as component 26, by the seal member 20 before contact is made with the torque shoulder 12 resulting in a low-pressure seal between the seal member 20 and the component 26. Upon further reduction of space between the first and second components 22 and 26, the torque shoulder 12 will also make contact with the second component 26. The torque shoulder is not intended to make a seal but rather to limit compression on the seal member 20 in order to ensure member 20 remains in elastic deformation and does not yield into plastic deformation. This is particularly important when large and powerful machines are used to torque pipe sections together and would, without the torque shoulder 12, require careful monitoring of inputted torque. Due to the torque shoulder 12, less concern is necessary in this regard. The torque shoulder 12 has this function regardless of how the components 22 and 26 are brought toward one another (e.g. press fit or thread, for example) Additionally, the concavity 16 will provide support to the seal member 20 with sufficient compression and pressure differential.

Figure 3:
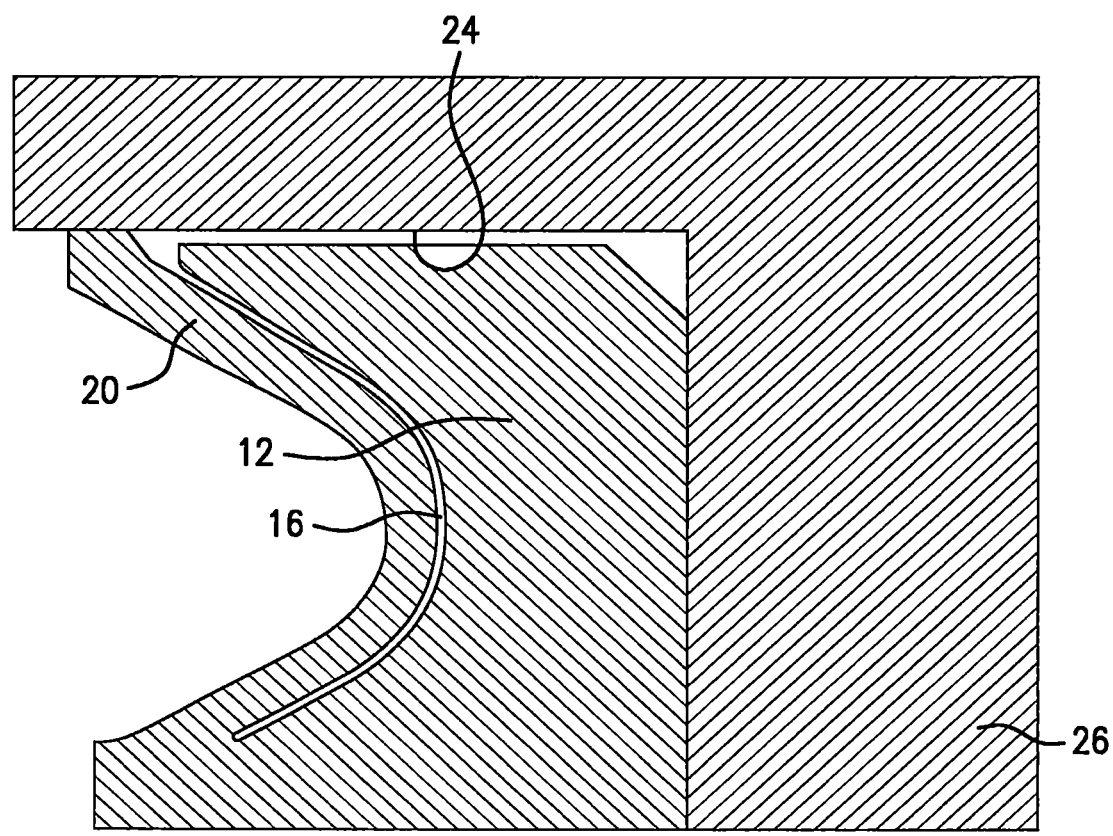
FIG. 3-6 are a sequence of an enlarged illustrations of the seal in progressively increasingly loaded sealed positions.
Figure 4:
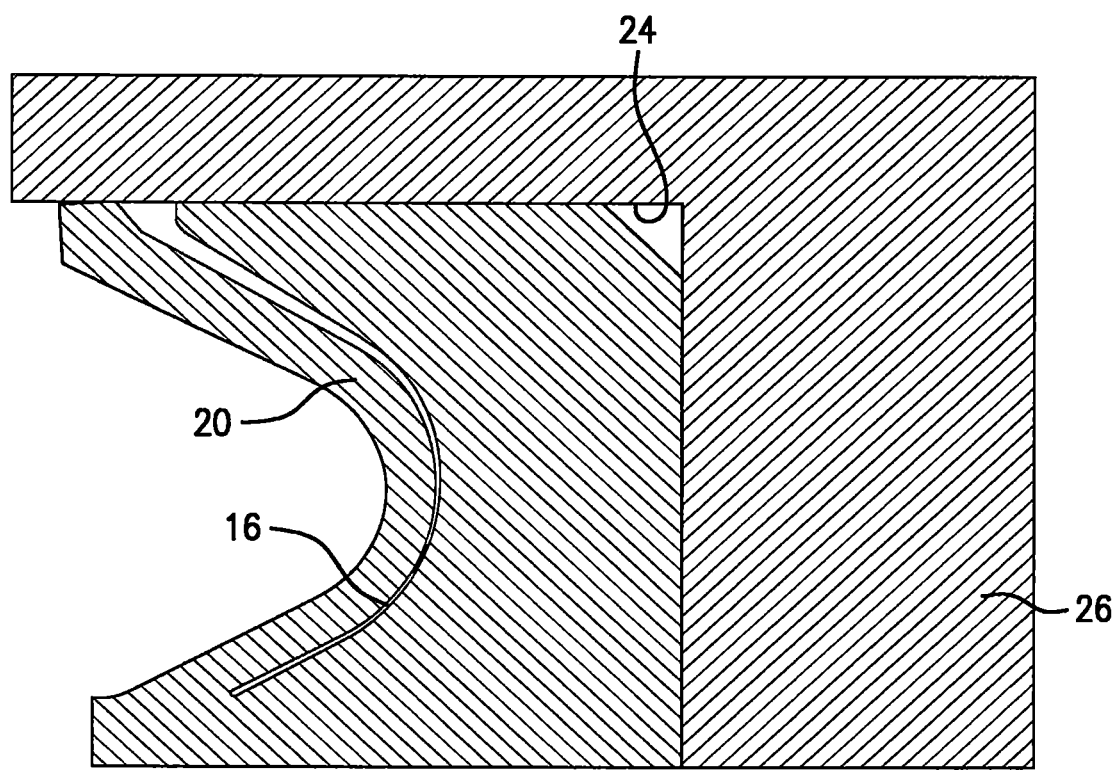

Referring to FIGS. 3-6, differently loaded sealed positions are illustrated. In FIG. 3, a lower pressure seal is illustrated where the seal member 20 has made contact with surface 24 of component 26. It will be appreciated that seal member 20 is bowed in appearance, representing a portion of a toroid if considered three dimensionally. The elastic resistance to bending of the seal member 20 is what creates the seal in this position. Referring to FIG. 4, the components 22 and 26 are closer together thereby bringing the torque shoulder 12 into contact with surface 24. The seal member 20 is more heavily loaded in this position but is still in the elastic deformation range by design. The torque shoulder 12 at this position limits the components 22 and 26 from getting any nearer each other and thereby prevents further compressive loading from assembly being applied to the seal member 20.

Figure 5:
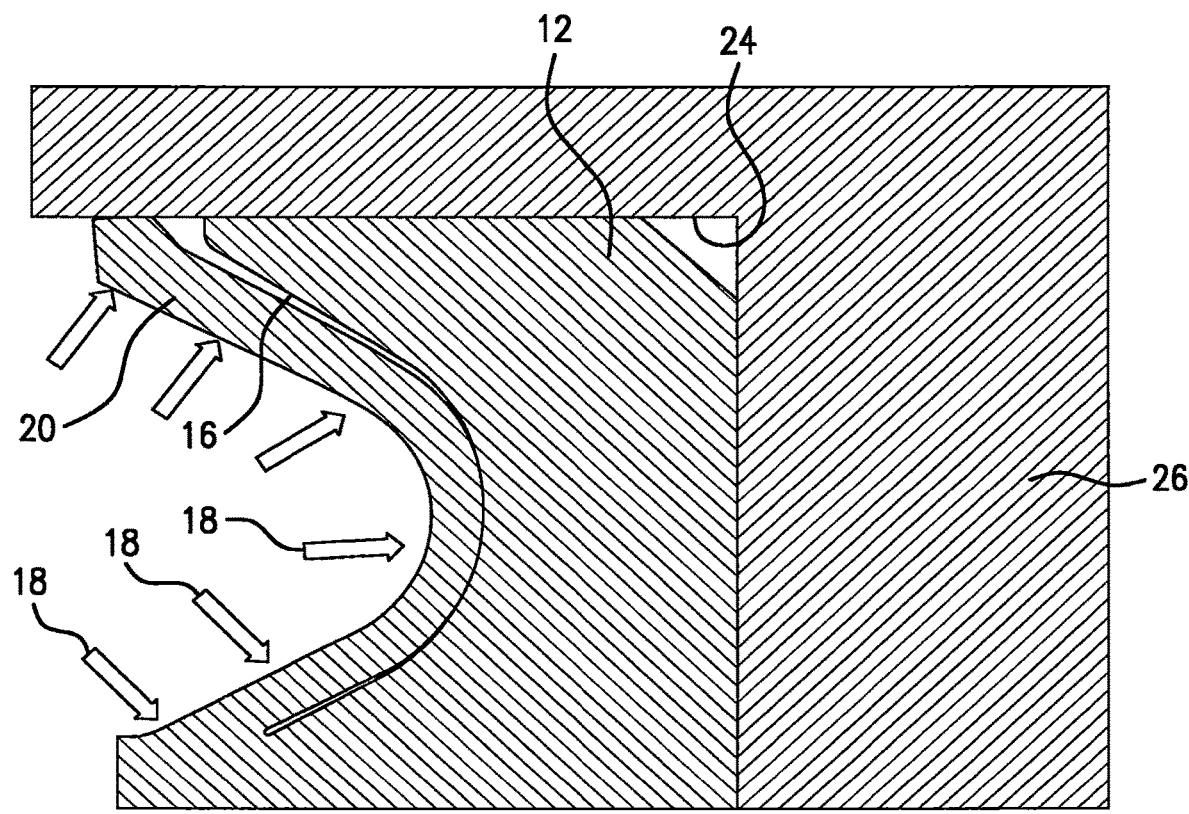
Figure 6:
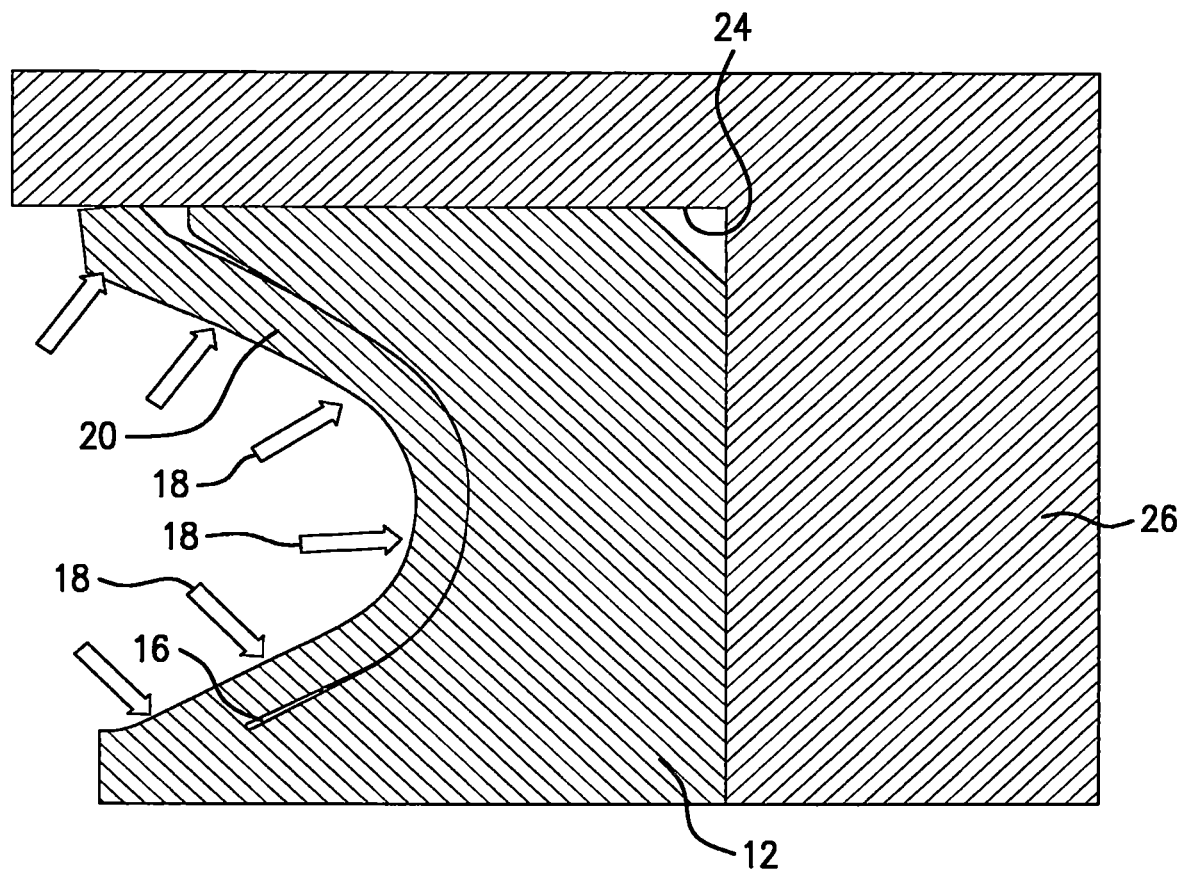

Referring to FIGS. 5 and 6, the value of the concavity 16 becomes apparent with increasing pressure differential being held across the seal 10. Arrows 28 indicate pressure acting on the seal member 20. In FIG. 5, it may be appreciated that the seal member 20 has deflected into contact with the concavity 16 around a mid point of the seal member 20, while in FIG. 6, at a higher differential pressure than depicted in FIG. 5, almost all of the seal member 20 is in contact with the concavity 16. The concavity 16 prevents the seal member 20 collapsing to break the seal. With each of these positions, the seal member 20 is protected from plastic deformation and hence will have a long service life and be capable of repeated sealing and unsealing operations over that lifetime.

Figure 7:
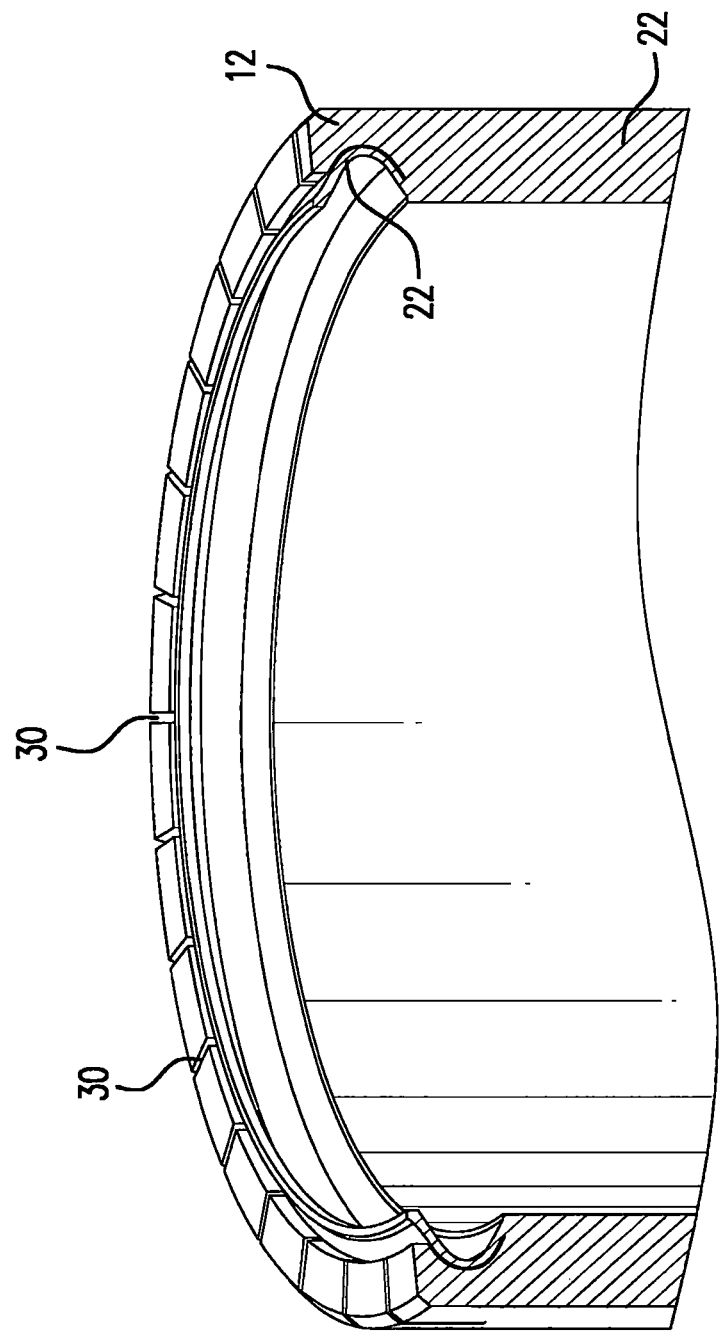
FIG. 7 is a view illustrating an alternate embodiment of the seal.
Figure 8:
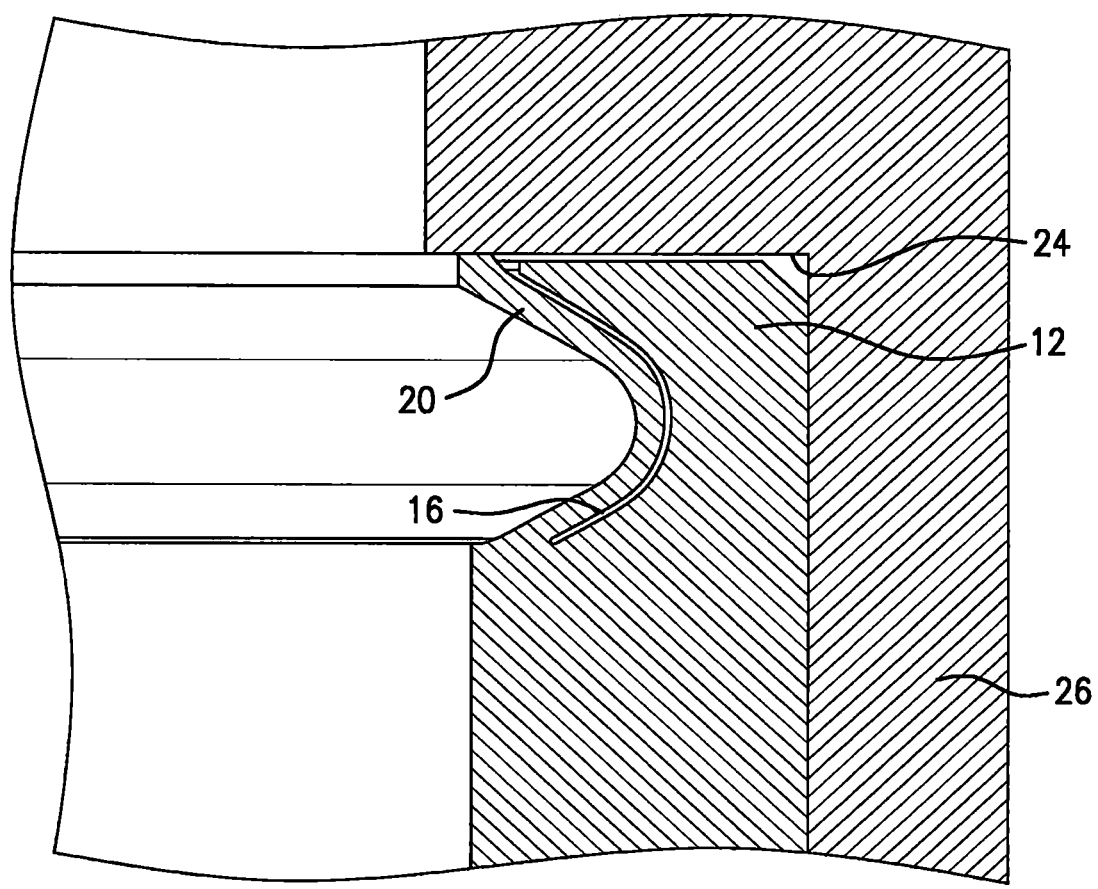
FIG. 8 is a descriptive view illustrating a direction of seal bypass.

Referring to FIGS. 7-8, another feature of the seal 10 is addressed. This is due to the geometry the seal 10 has and the angle at which the seal member 20 intersects the component 26. Specifically, and referring to the figure, it will be appreciated that a pressure from radially outwardly of the seal 10 will be able to burp past the seal 10 while pressure from radially inwardly of the seal 10 cannot. This can be useful in some situations relating to other borehole operations. Aiding in this function, optional slits 30 (see FIG. 7) may be provided.

Figure 9:
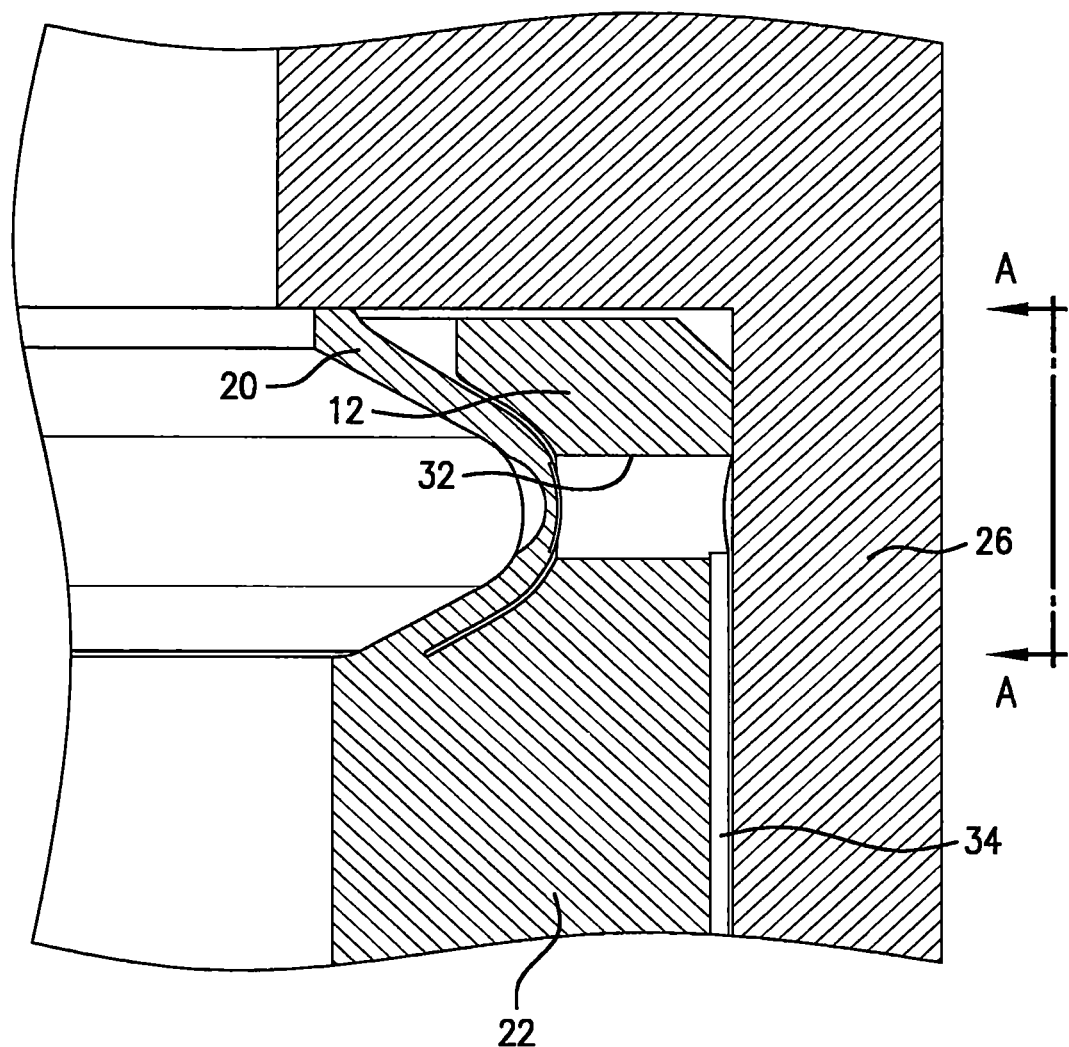
FIG. 9 is another alternate embodiment configured to allow seal rupture at a threshold pressure.
Figure 10:
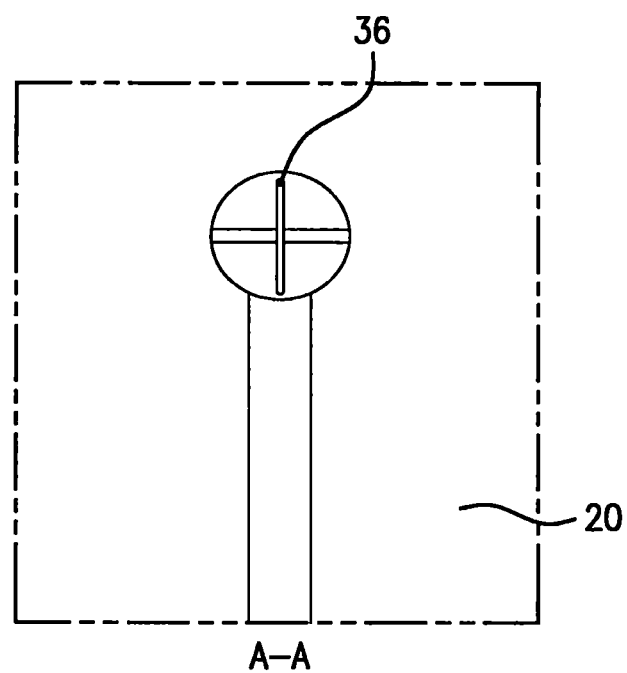
FIG. 10 illustrates a stress riser for the seal in FIG. 9.

In another embodiment, referring to FIGS. 9 and 10, seal 10 is intended to rupture at a predetermined pressure differential. In order to support this purpose, the torque shoulder 12 is modified with a recess/port 32 that extends into the body of the shoulder 12 or in an embodiment extends all the say through the torque shoulder 12 as a port. Also illustrated is a drain channel 34 to allow fluid pressure having escaped through breach of the seal member 20 to escape the port 32 as well. Because of the port 32, there is no support behind the seal member 20 at the port and hence only the thickness of the material of the seal member 20 is available to hold pressure. When pressure exceeds the physical ability of that material at the port 32, the seal member 20 will rupture at the port 32 allowing pressure and fluid to flow through ports 32 and through channel 34. It is easily within the level of one of skill in the art to determine what pressure may be held by a thickness of material given the type and properties of material, the span it must cross (the port 32 diameter). This embodiment may be particularly useful where a plurality of actuations must occur with the seal intact and then a separate set may be set in motion by the breach of the seal 10. In some of these embodiments, it may also be desirable to provide a stress riser 36 in the seal member 10 at the port 32. FIG. 10 illustrates one possibility of a stress riser 36, which may be a score mark or other modification of the properties of the seal member 20 such as heat treatment, etc.

Figure 11:
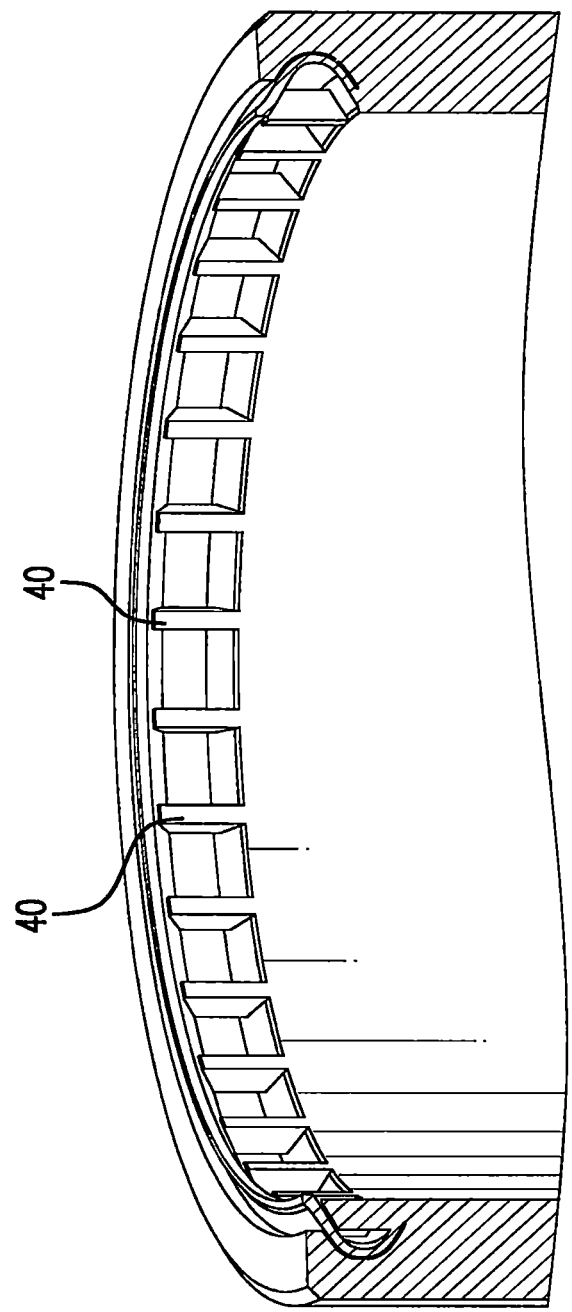
FIGS. 11-13 illustrate another embodiment where a support is provided across the seal member.
Figure 12:
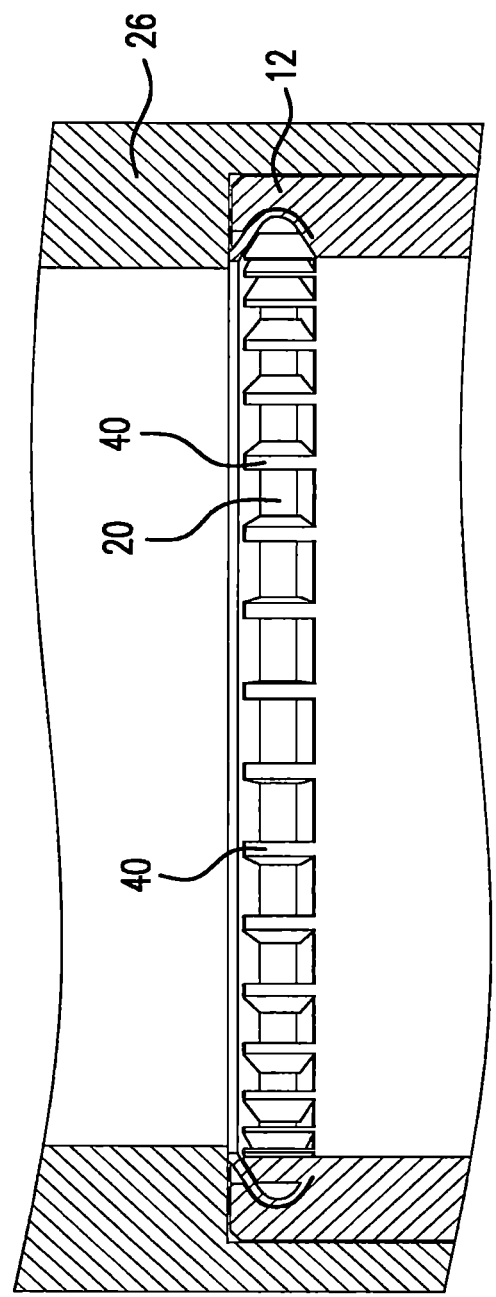
Figure 13:
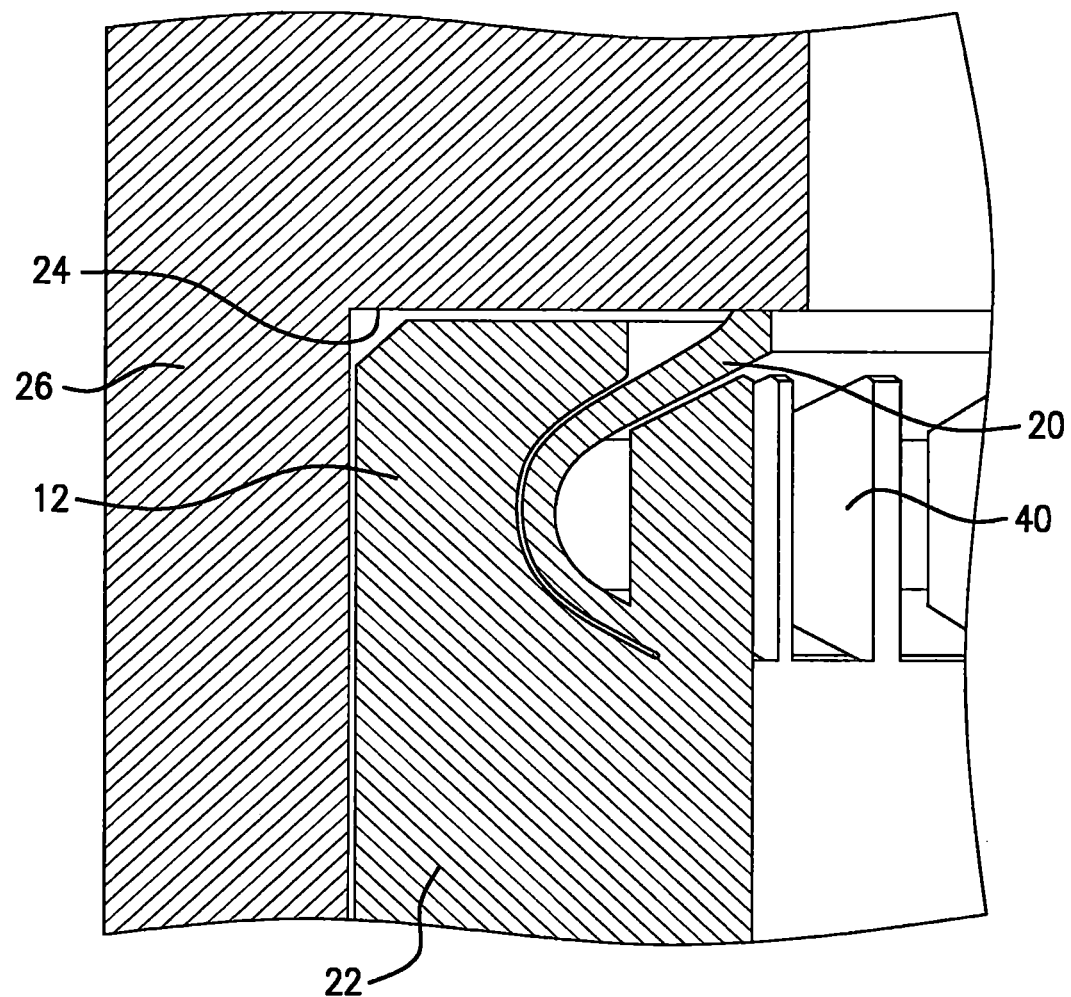

Referring to FIGS. 11-13, another embodiment is illustrated that provides additional support to seal member 20. In this embodiment, supports 40 extend from one end of seal member 20 toward an opposite end of seal member 20 and will be contacted by that other end of seal 20 when a compressive load is placed upon the seal member 20 such as when bringing components 22 and 26 together.

Figure 14:
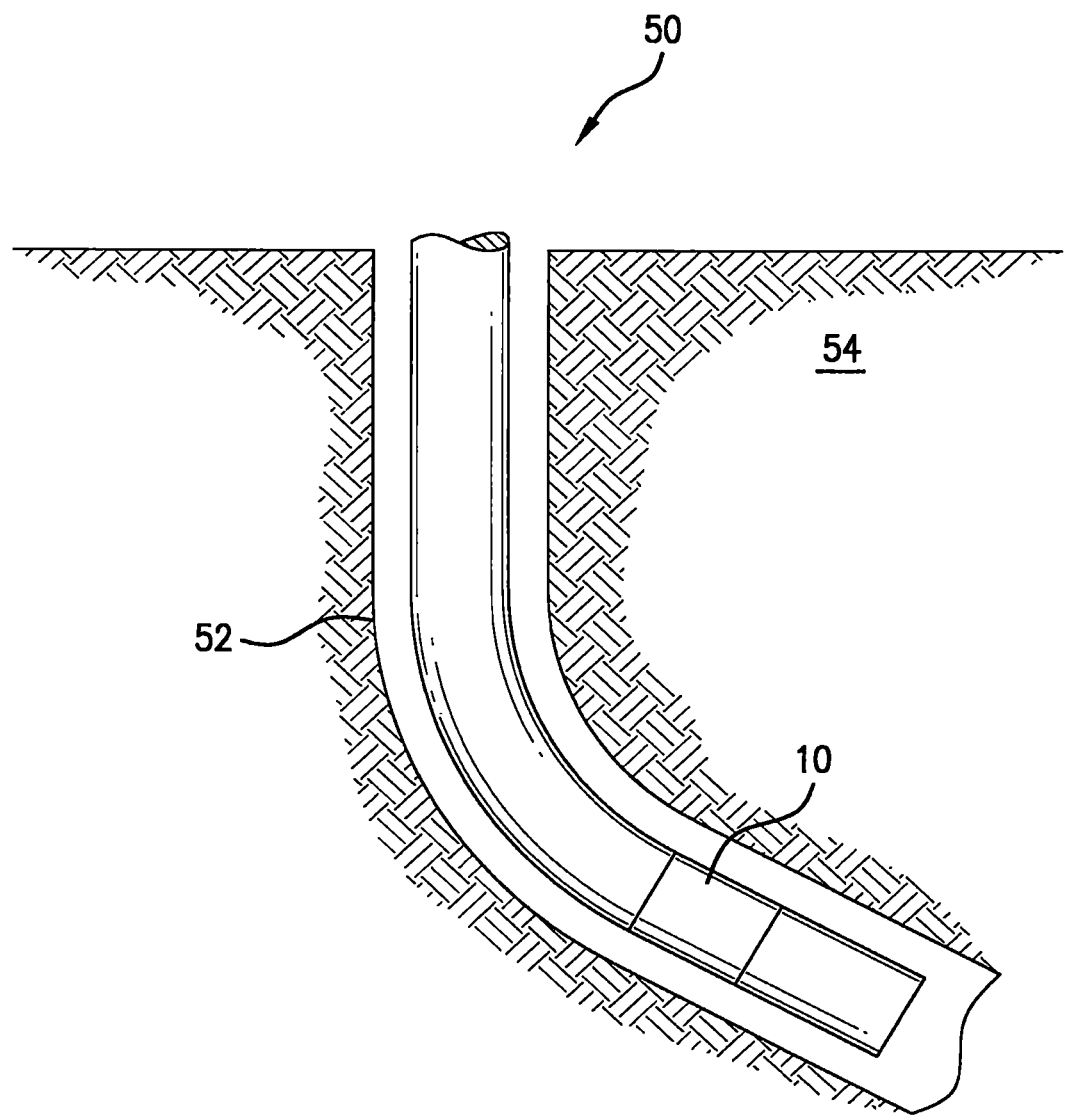
FIG. 14 is a view of a borehole system including the seal as disclosed herein.

Referring to FIG. 14, a borehole system 50 is illustrated. The system 50 comprises a borehole 52 in a subsurface formation 54. A seal 10 as disclosed herein is disposed within the borehole 52.

Set forth below are some embodiments of the foregoing disclosure:

Embodiment 1: A seal including a torque shoulder having a torque face and a seal support concavity, the torque shoulder having a longitudinal extent and an arcuately shaped seal member complimentary to the concavity and spaced from the torque shoulder when in an uncompressed position.

Embodiment 2: The seal as in any prior embodiment, wherein the seal member is configured to contact a structure against which a seal is to be made during use prior to contact of the structure with the torque shoulder.

Embodiment 3: The seal as in any prior embodiment, wherein the seal member nests with the concavity when in use to make a seal.

Embodiment 4: The seal as in any prior embodiment, wherein the nested position prevents plastic deformation of the seal member.

Embodiment 5: The seal as in any prior embodiment, wherein the torque shoulder limits compressive force on the seal member when in use.

Embodiment 6: The seal as in any prior embodiment, wherein the torque shoulder includes a radial channel.

Embodiment 7: The seal as in any prior embodiment, wherein the torque shoulder includes a recess extending from the concavity into a body of the torque shoulder.

Embodiment 8: The seal as in any prior embodiment, wherein the recess is a port that extends entirely through the torque shoulder.

Embodiment 9: The seal as in any prior embodiment, wherein the seal member is rupturable at the recess at a predetermined pressure.

Embodiment 10: The seal as in any prior embodiment, wherein the seal member includes a stress riser aligned with the port.

Embodiment 11: The seal as in any prior embodiment, wherein the seal member further includes a support member extending from one end of the seal member toward an opposite end of the seal member such that in use, the opposite end of the seal member is physically supported by the support.

Embodiment 12: A method for sealing a connection including urging a first component toward a second component, where one of the components includes the seal as in any prior embodiment, contacting the seal member with the first or second component, elastically deflecting the seal member, and contacting the torque shoulder with the same first or second component and limiting deflection of the seal member by preventing further movement of the first component and second component toward one another after contacting of the torque shoulder.

Embodiment 13: The method as in any prior embodiment wherein the deflecting is into contact with the concavity of the torque shoulder.

Embodiment 14: The method as in any prior embodiment, further including burping the seal with higher pressure from radially outward of the seal member and preventing burping with higher pressure from radially inwardly of the seal.

Embodiment 15: The method as in any prior embodiment, wherein the urging is by rotating the first and second components relative to each other and engaging a thread.

Embodiment 16: The method as in any prior embodiment, further including over-pressuring the seal member from radially inwardly of the seal member.

Embodiment 17: The method as in any prior embodiment, wherein the rupturing is into a recess in the concavity.

Embodiment 18: The method as in any prior embodiment, further including elastically deforming one end of the seal member into contact with a support extending from an opposite end of the seal member.

Embodiment 19: A downhole tool having a first seal as in any prior embodiment and a second seal as in any prior embodiment oriented in an opposite direction to the first seal.

Embodiment 20: A borehole system including a borehole in a subsurface formation, a downhole tool in the borehole, the tool including the seal as in any prior embodiment.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A seal comprising:
   a torque shoulder having a torque face and a seal support concavity, the torque shoulder having a longitudinal extent; and
   an arcuately shaped seal member integrally formed with the torque shoulder and complimentary to the concavity and spaced from the torque shoulder when in an uncompressed position.

2. The seal as claimed in claim 1, wherein the seal member is configured to contact a structure against which a seal is to be made during use prior to contact of the structure with the torque shoulder.

3. The seal as claimed in claim 1, wherein the seal member nests with the concavity when in use to make a seal.

4. The seal as claimed in claim 3, wherein the nested position prevents plastic deformation of the seal member.

5. The seal as claimed in claim 1, wherein the torque shoulder limits compressive force on the seal member when in use.

6. The seal as claimed in claim 1, wherein the torque shoulder includes a radial channel.

7. The seal as claimed in claim 1, wherein the torque shoulder includes a recess extending from the concavity into a body of the torque shoulder.

8. The seal as claimed in claim 7, wherein the recess is a port that extends entirely through the torque shoulder.

9. The seal as claimed in claim 8, wherein the seal member is rupturable at the recess at a predetermined pressure.

10. The seal as claimed in claim 9, wherein the seal member includes a stress riser aligned with the port.

11. The seal as claimed in claim 1, wherein the seal member further includes a support member extending from one end of the seal member toward an opposite end of the seal member such that in use, the opposite end of the seal member is physically supported by the support.

12. A method for sealing a connection comprising:
    urging a first component toward a second component, where one of the components includes a seal comprising:
    a torque shoulder having a torque face and a seal support concavity, the torque shoulder having a longitudinal extent; and
    an arcuately shaped seal member complimentary to the concavity and spaced from the torque shoulder when in an uncompressed position;
    contacting the seal member with the first or second component;
    elastically deflecting the seal member; and
    contacting the torque shoulder with the same first or second component and limiting deflection of the seal member by preventing further movement of the first component and second component toward one another after contacting of the torque shoulder.

13. The method as claimed in claim 12 wherein the deflecting is into contact with the concavity of the torque shoulder.

14. The method as claimed in claim 12, further including burping the seal with higher pressure from radially outward of the seal member and preventing burping with higher pressure from radially inwardly of the seal.

15. The method as claimed in claim 12, wherein the urging is by rotating the first and second components relative to each other and engaging a thread.

16. The method as claimed in claim 12, further including over-pressuring the seal member from radially inwardly of the seal member.

17. The method as claimed in claim 16, wherein the rupturing is into a recess in the concavity.

18. The method as claimed in claim 12, further including elastically deforming one end of the seal member into contact with a support extending from an opposite end of the seal member.

19. A downhole tool having a first seal as claimed in claim 1 and a second seal as claimed in claim 1 oriented in an opposite direction to the first seal.

20. A borehole system comprising:
- a borehole in a subsurface formation;
- a downhole tool in the borehole, the tool including the seal as claimed in claim 1.

* * * * *